US 6,645,119 B2

(12) United States Patent  (10) Patent No.: US 6,645,119 B2
Seo  (45) Date of Patent: Nov. 11, 2003

(54) PINION CARRIER ASSEMBLY FOR AN AUTOMATIC TRANSMISSION

(75) Inventor: Tae-Seok Seo, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/988,045

(22) Filed: Nov. 16, 2001

(65) Prior Publication Data
US 2002/0077214 A1 Jun. 20, 2002

(30) Foreign Application Priority Data
Dec. 19, 2000 (KR) .......... 2000-78384

(51) Int. Cl.7 .......... F16H 57/08; B21D 39/00
(52) U.S. Cl. .......... 475/331; 29/515
(58) Field of Search .......... 74/530, 579 R, 74/579 F; 475/346, 331; 29/523, 512, 515

(56) References Cited

U.S. PATENT DOCUMENTS

| 2,501,034 A | * | 3/1950 | Derbyshire | .......... 475/346 |
| 4,325,589 A | * | 4/1982 | Hirt | .......... 308/101 |
| 4,340,560 A | * | 7/1982 | Migeon | .......... 264/249 |
| 5,928,100 A | * | 7/1999 | Ohtake et al. | .......... 475/159 |
| 6,463,646 B2 | * | 10/2002 | Yamazaki et al. | .......... 29/515 X |

FOREIGN PATENT DOCUMENTS

| JP | 404341641 | * | 11/1992 | .......... 475/331 |
| JP | 05-215190 | | 8/1993 | |
| JP | 405215190 | * | 8/1993 | .......... 475/159 |
| JP | 405285745 | * | 11/1993 | .......... 29/795 |
| JP | 406081906 | * | 3/1994 | .......... 475/340 |

* cited by examiner

Primary Examiner—Roger Pang
(74) Attorney, Agent, or Firm—Birch, Stewart, Kolasch & Birch, LLP

(57) ABSTRACT

This invention provides a pinion carrier assembly for an automatic transmission, which comprises a pinion carrier body and a pinion shaft fixed to the pinion carrier body for rotatably supporting a pinion gear, wherein the pinion shaft is fixed to the pinion carrier body by calking. The pinion carrier assembly according to this invention can be effectively manufactured under automation and thereby the quality of the carrier assembly can be uniformly maintained.

4 Claims, 2 Drawing Sheets

PINION CARRIER ASSEMBLY FOR AN AUTOMATIC TRANSMISSION

CROSS-REFERENCE TO RELATED APPLICATION

This application claims priority of Korea patent Application No. 2000-78384, filed on Dec. 19, 2000.

BACKGROUND OF THE INVENTION (a) Field of the Invention

The present invention relates to a planetary gear system used for an automatic transmission, and more particularly, to a pinion carrier assembly that carries pinion gears in a planetary gear system.

(b) Description of the Related Art

A conventional planetary gear system includes a sun gear and a ring gear with pinion gears engaged between the sun and ring gears. The pinion gears are connected to and carried by a pinion carrier assembly.

The pinion carrier assembly includes a pinion carrier body and pinion shafts, the pinion shafts being fixed to the pinion carrier body for rotatably supporting the pinion gears.

Various structures for fixing the pinion shaft to the pinion carrier body have been realized and a most typical one is such that a connecting hole is formed in each of the pinion shaft and pinion carrier body, where a locking pin engaged through the holes holds tight connection between the pinion shaft and the pinion carrier body.

However, the typical structure for fixing the pinion shaft to the pinion carrier body implies that a process for forming holes in the pinion shaft and the pinion carrier body and a locking pin are necessary in order to manufacture a pinion carrier assembly, which results in complications of manufacturing and an increase of time and cost for the manufacturing.

SUMMARY OF THE INVENTION

The present invention has been made in an effort to reduce time and cost for manufacturing a pinion carrier assembly, and it is an objective of the present invention to provide a pinion carrier assembly that has a structure that enables shortening manufacturing time and reducing a number of parts included in the pinion carrier assembly.

To achieve the above objective, the present invention provides a pinion carrier assembly that includes a pinion carrier body and a pinion shaft that is fixed to the pinion carrier body for rotatably supporting a pinion gear, wherein the pinion shaft is fixed to the pinion carrier body by calking.

Deformation grooves are formed in a calking portion of the pinion carrier body so that the calking portion of the pinion carrier body can be easily deformed toward the pinion shaft, and the deformation grooves are formed parallel to one another and in a direction tangential to the circumference of the pinion shaft.

The calking portion of the pinion shaft is indented so that the pinion shaft can also be deformed in order to accept the deformation of the calking portion of the pinion carrier body.

The indent formed in the pinion shaft is preferably a linear groove formed on the surface of the calking portion of the pinion shaft and/or a bevel around its edge.

More specifically, a penetration hole for receiving the pinion shaft is formed in an outer part of the pinion carrier body, the pinion shaft is inserted through the penetration hole and one end of the pinion shaft is sustained by an inner part of the pinion carrier body, and the outer part of the pinion carrier body is calked to the other end of the pinion shaft.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will hereinafter be described in detail with reference to the accompanying drawings.

Figure 1:
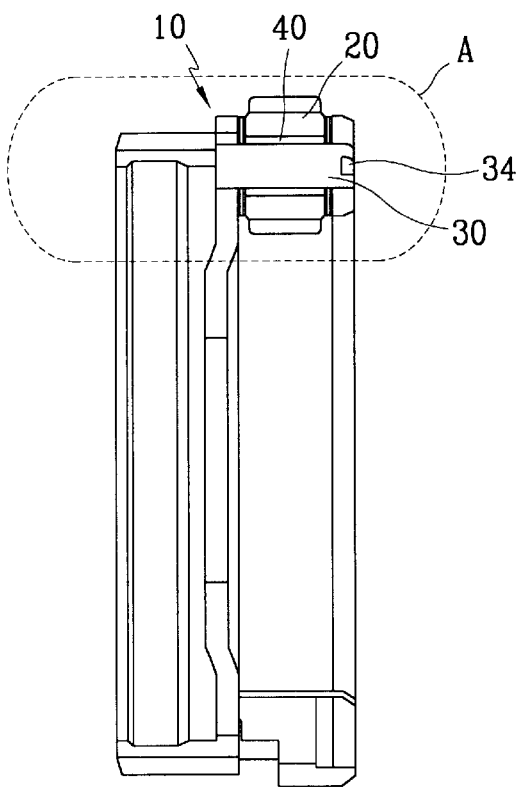
FIG. 1 is a cross-sectional view of a pinion carrier assembly according to a preferred embodiment of the present invention, the cross-section being taken along its axis.

FIG. 1 is a cross-sectional view of a pinion carrier assembly according to a preferred embodiment of the present invention, the cross-section being taken along its axis.

As shown in FIG. 1, the preferred embodiment of the present invention includes a pinion carrier body 10 and a pinion shaft 30.

FIG. 1 further shows a pinion gear 20 for engaging a sun gear (not shown) and a ring gear (not shown) through a gear mechanism.

When a plurality of such pinion gears 20 is adopted to transfer force from the sun gear to the ring gear and vice versa, the pinion carrier body 10 rigidly holds the pinion gears 20 and supports its rotary motion.

For the function of the pinion carrier body 10, a pinion shaft 30 is fixedly mounted to the pinion carrier body 10 in order to rotatably support the pinion gear 20. A pinion gear 20 is rotatably mounted around the pinion shaft 30 with a bearing 40 disposed between the pinion shaft 30 and pinion gear 20. Therefore the pinion gear 20 can rotate on the pinion shaft 30 and also can revolve around the sun gear (not shown).

A thrust washer 50 and a metal thrust bearing 55 are disposed between the pinion carrier body 10 and pinion gear 20 on the pinion shaft 30.

A penetration hole for receiving the pinion shaft 30 is formed in an outer (right-hand side of FIGS. 1 and 2) part 12 of the pinion carrier body 10 and the pinion shaft 30 is inserted through the penetration hole so that one end 31 of the pinion shaft 30 is sustained by an inner part of the pinion carrier body 10.

The outer part 12 of the pinion carrier body 10 is then calked to the other end 32 of the pinion shaft 30 so that the pinion shaft 30 becomes fixed to the pinion carrier body 10.

Calking (or caulking) is a technical term to describe a process of giving an impact on a seam between two contiguous metal materials so that the two metal materials become tightly conjoined, as is well known to one skilled in the art.

A calking portion for receiving the impact is predetermined to be an outward portion of the pinion shaft 30 (see FIG. 2) according to the preferred embodiment of the present invention, although the calking portion may also be predetermined to be an inward portion of the pinion shaft 30.

The calking portion of the pinion shaft is indented so that the pinion shaft 30 can easily be deformed by the impact of calking in order to accept the deformation of the outer part 12 of the pinion carrier body 10.

Figure 2:
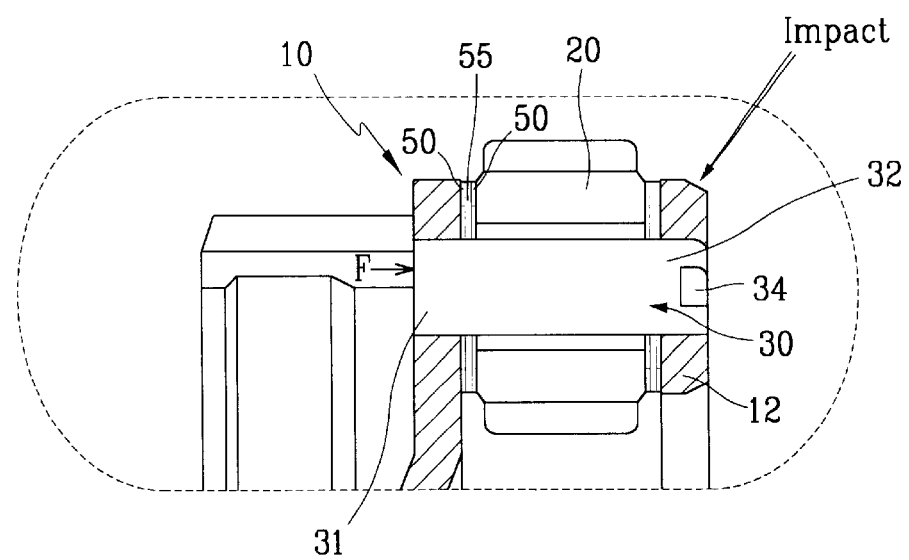
FIG. 2 is an enlarged view of portion A in FIG. 1.
Figure 3:
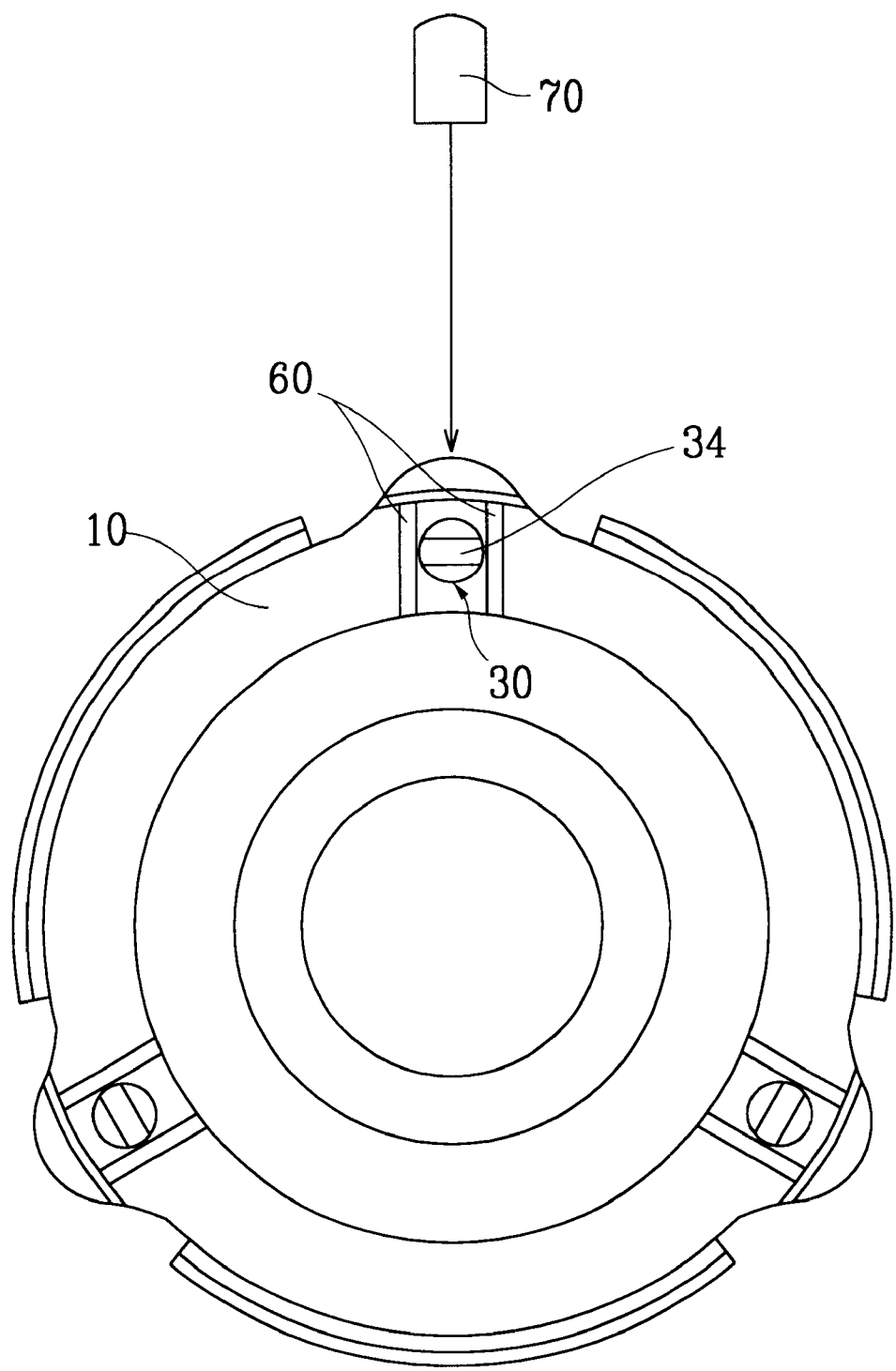
FIG. 3 is a non-cross-sectioned right-hand side view of the FIG. 1.

FIGS. 2 and 3 show that the surface of the end 32 of the pinion shaft 30 is indented to form a groove 34, the groove 34 being aligned vertically to a predetermined direction of the impact of calking.

In addition, as shown in FIG. 3, deformation grooves 60 are formed into a calking portion of the pinion carrier body 10 so that the calking portion of the pinion carrier body 10 can easily be deformed by the impact of calking. The deformation grooves 60 are formed parallel to one another and in a direction tangential to the circumference around the pinion shaft 30. Therefore the calking portion of the pinion carrier body 10 is defined by the deformation grooves and the calking portion of the pinion carrier body 10 can be easily deformed by the impact of calking.

A process of manufacturing the pinion carrier assembly according to the preferred embodiment of the present invention is hereinafter described in detail.

After positioning the pinion gear 20 at the pinion carrier body 10, the pinion shaft 30 is inserted through the penetration hole penetrating the center of the pinion gear 20 and the outer part 12 of the pinion carrier body 10.

Subsequently a calking impact is applied to the calking portion of the pinion carrier body 10 using a punch 70 of a predetermined shape. Thereby the pinion carrier body 10 and the pinion shaft 30 are calked with a predetermined conjoining strength, and consequently the pinion shaft 30 can hold its position against a force F acting on the end 31 of the pinion shaft 30. It is preferable that the conjoining strength is predetermined such that the pinion shaft can hold its position when the force F is not greater than 2 kgf because such level of conjoining strength suffices to hold the pinion shaft 30 in ordinary operating situations of a pinion carrier assembly.

As described above, a carrier assembly according to the preferred embodiment of the present invention, in which a pinion shaft is conjoined to a pinion carrier body by calking, can be more effectively manufactured under automation and thereby the quality of the carrier assembly can be uniformly maintained. Reduced amounts of materials and processes needed for manufacturing the carrier assembly also reduces manufacturing cost as well as reducing the mass of the carrier assembly.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims:

What is claimed is:

1. A pinion carrier assembly for an automatic transmission, which comprises:
    a pinion carrier body; and
    a pinion shaft fixed to the pinion carrier body for rotatably supporting a pinion gear,
    wherein:
        a plurality of deformation grooves for defining a calking portion are formed in the pinion carrier body; and
        the pinion shaft is fixed to the pinion carrier body by applying an impact of calking to the calking portion of the pinion carrier body.

2. The pinion carrier assembly of claim 1 wherein the plurality of deformation grooves are formed parallel to one another, and in a direction tangential to the circumference of the pinion shaft such that the calking portion of the pinion carrier body can easily be deformed by the impact of calking.

3. The pinion carrier assembly of claim 1 wherein a calking portion of the pinion shaft is indented such that the calking portion of the pinion shaft deforms under the impact of calking.

4. The pinion carrier assembly of claim 1 wherein:
    a penetration hole for receiving the pinion shaft is formed in an outer part of the pinion carrier body;
    the pinion shaft is inserted through the penetration hole and one end of the pinion shaft is sustained by an inner part of the pinion carrier body; and
    an outer part of the pinion carrier body is calked to the other end of the pinion shaft.

* * * * *